(12) United States Patent
Smarsh et al.

(10) Patent No.: US 7,435,157 B1
(45) Date of Patent: Oct. 14, 2008

(54) GRINDING MACHINE, COMPUTER SOFTWARE TO OPERATE SUCH A MACHINE, AND THEIR USES THEREFOR

(76) Inventors: Steven G. Smarsh, 606 Wellington Crescent, Mt. Clemens, MI (US) 48043; Brian M. Gehrke, 19406 Nicke, Clinton Township, MI (US) 48035

( * ) Notice: Subject to any disclaimer, the term of this patent is extended or adjusted under 35 U.S.C. 154(b) by 0 days.

(21) Appl. No.: 09/720,576

(22) PCT Filed: Jun. 22, 1999

(86) PCT No.: PCT/US99/14054

§ 371 (c)(1),
(2), (4) Date: Dec. 22, 2000

(87) PCT Pub. No.: WO99/67052

PCT Pub. Date: Dec. 29, 1999

Related U.S. Application Data

(60) Provisional application No. 60/090,233, filed on Jun. 22, 1998.

(51) Int. Cl.
*B24B 49/00* (2006.01)

(52) U.S. Cl. .............................. 451/5; 451/11; 451/56; 451/242; 451/443

(58) Field of Classification Search ............... 451/5, 451/8, 10, 11, 21, 49, 56, 242, 243, 246, 451/443
See application file for complete search history.

(56) References Cited

U.S. PATENT DOCUMENTS

| | | |
|---|---|---|
| 4,570,386 A | 2/1986 | Unno et al. |
| 4,639,170 A | 1/1987 | Palm |
| 4,854,568 A | 8/1989 | Baeza et al. |
| 5,002,264 A | 3/1991 | Nimtz |
| 5,097,602 A | 3/1992 | Cross et al. |
| 5,103,700 A | 4/1992 | Read, Sr. |
| 5,121,571 A | 6/1992 | Smarsh |
| 5,174,179 A | 12/1992 | Hiestand |
| 5,527,400 A | 6/1996 | Smith et al. |
| 5,595,525 A | 1/1997 | Hayashi et al. |
| 5,630,747 A | 5/1997 | Haller |
| 5,647,788 A | 7/1997 | McHugh et al. |
| 5,746,643 A | 5/1998 | Terasaki et al. |
| 5,746,644 A | 5/1998 | Cheetham |
| 5,766,057 A | 6/1998 | Maack |
| 5,893,793 A | 4/1999 | Nishio et al. |
| 5,957,752 A * | 9/1999 | Katakura ...................... 451/10 |
| 6,123,605 A * | 9/2000 | Yano ............................ 451/49 |
| 6,569,000 B1 * | 5/2003 | Mushardt et al. .............. 451/72 |

FOREIGN PATENT DOCUMENTS

| | | |
|---|---|---|
| JP | S37-29360 | 12/1965 |
| JP | S54-003987 | 1/1979 |
| JP | S58-132461 | 8/1983 |
| JP | S-63-099173 | 4/1988 |

* cited by examiner

*Primary Examiner*—Eileen P. Morgan
(74) *Attorney, Agent, or Firm*—Cargill & Associates, PLLC; Lynn E. Cargill

(57) ABSTRACT

An extremely precise computer controlled grinding machine having the capability to write its own computer programs for controlling the grinding machine to perform individual tasks, including both grinding and dressing to several millionths of an inch. A new device for dressing is included which is directly on the machine, alleviating the need for a separate dressing machine. The Windows-based computer program is easy to use, and includes numerous features for self-maintenance and reproducibility.

9 Claims, 16 Drawing Sheets

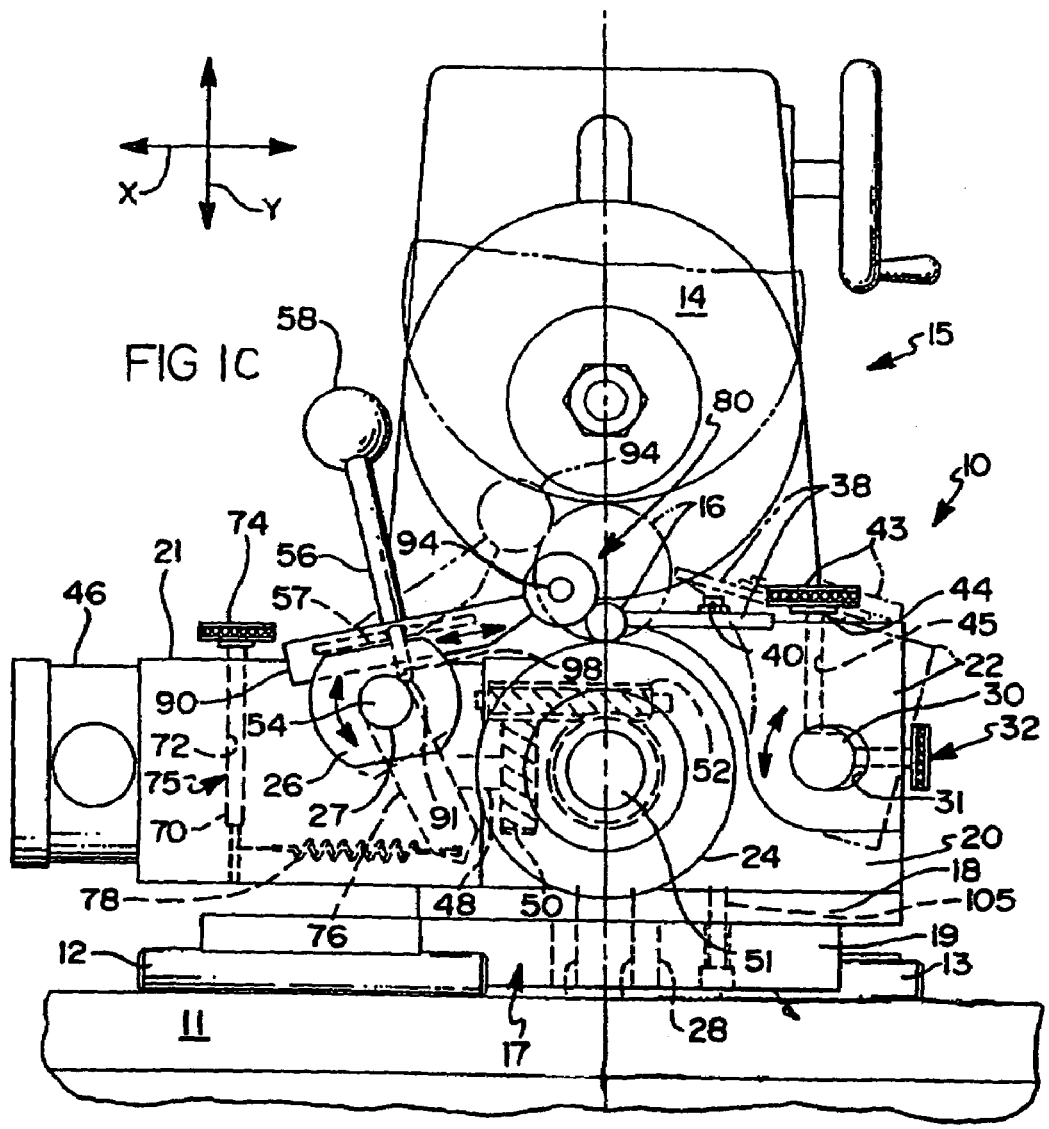

| Axis 1 Positions | Axis 1 Velocities | Radius | Axis 2 Positions | Axis 2 Velocities | Path Velocities |
|---|---|---|---|---|---|
| ☐ Rapid Down To | ☐ Velocity Down | ☐ Radius Value | ☐ Rapid In To | ☐ Velocity In | ☐ Radius Velocity |
| 00.00000 | 05.00000 | | | | |
| Plunge To | Velocity of Axis 1 | | Move Out to | Velocity of Axis 2 | |
| 00.02000 | 00.05000 | | | | |

7. Next, enter the values as shown in figure Fig 16.

GRINDING MACHINE, COMPUTER SOFTWARE TO OPERATE SUCH A MACHINE, AND THEIR USES THEREFOR

This patent application claims the benefit of prior filed U.S. Provisional Patent Application No. 60/090,233 filed on 22 Jun. 1998, which Provisional patent application is incorporated by reference herein.

BACKGROUND OF THE INVENTION

1. Field of the Invention

The present invention relates generally to a computer controlled grinding machine for grinding and shaping workpieces and, more particularly, to an extremely accurate compact grinding machine controlled by a computer that writes its own programs.

2. Description of the Related Art

Grinding of workpieces into desired shapes has been desirable for hundreds of years, and as such there are many different types of grinding. Grinding operations as contemplated in the present invention may include, among others, the following operations: grinding, cut-off, lathe, two-axis grinding, OD grinding, ID grinding, turning and centerless grinding.

Centerless grinding is a well-known art useful for grinding rotatable workpieces to high precision. Conventional centerless grinding operations use a workpiece support apparatus and a grinding wheel apparatus, both of which are well-known in the art.

In conventional apparatuses, the grinding wheel apparatus typically includes a wheel spindle head which is vertically movable, i.e., movable up and down along the "y" axis, a means such as a ball or lead screw which is driven by an y-axis motor for moving the wheel spindle head, a spindle extending through and beyond the wheel spindle head, a grinding wheel mounted on the spindle, and a motor for rotating the spindle and grinding wheel.

Prior art U.S. Pat. Nos. 5,746,643 and 5,746,644 disclose numerically controlled grinding machines. Although these patents disclose useful grinding machines, they must be individually programmed for each cutting or grinding operation.

One exceptional workpiece support apparatus is disclosed in U.S. Pat. No. 5,121,571, issued Jun. 16, 1992, to Smarsh, which patent is incorporated herein by reference. The workpiece support apparatus of the Smarsh patent includes (among other beneficial components) a table, a base supported on the table, a carriage supported by the base, a horizontally-oriented spindle extending through and beyond the carriage, a regulating roller mounted on the spindle, and a means for rotating the spindle which thereby rotates the regulating roller. The regulating roller provides a rotating surface for supporting and rotating the workpiece.

Typically, the conventional regulating rollers are formed from a porous material so that micro-fine dust on the roller will not harm the friction characteristics and the workpiece may be rotated at a consistent speed. However, when the dust builds up to a point where the friction surface is too smooth to perform rolling operations, the surface must be roughened up to allow it to grip the workpiece during the grinding operation.

The table of the workpiece support apparatus is movable along a horizontal axis, or side-to-side, which will be referred to as the "z" axis. The table may be moved along the z axis by a z-axis motor which turns a belt/pulley/ball/or lead screw mechanism as is known in the art. The z-axis motor may be controlled by a conventional motion controller, such as Parker's COMPUMOTOR OEM 6200 motion controller, available from Parker Corporation of Rohnert Park, Calif.

By controlling the y-axis movement and the z-axis movement in the grinding apparatus, a workpiece may be ground as desired to meet various conformations. Current methods of controlling the y- and z-axis movement include the use of computer systems with individually written computer programs to direct the motion of the grinding apparatus. However, in these current methods, a highly-trained computer programmer writes a program template in programming language and a corresponding template in machine language so that the machine will perform based on the content of the program template. The grinding apparatus is then operated on request by running the computer program.

The accuracies with which these grinding operations may be performed is desirably as great as possible. Although the abovementioned Smarsh patent reveals a grinder capable of reproducibly grinding to several millionths of an inch, the present invention goes beyond that machine's capabilities in that the present invention can reproducibly, and nearly instantaneously achieve that result consistently. Furthermore, with the new computer programming capabilities, varying grinding operations, including dressing operations, can be performed on the same machine with minimal time being expended for the change of the routine.

It should be noted that forms can be ground into the regulating roller for various shaped parts by using the computer program and the grinding wheel of the present invention. In addition, the computer program can be used to shape or form conventional wheels with a single point diamond tool. This capability of the present machine to grind with such precision may be put to advantage in many ways, and should not be limited by the discussion within.

In conventional machines, if a variation of the computer program is desired, e.g., if it is desired to have the grinding wheel position slightly different, a completely new program needs to be written by the trained computer programmer. This is a very time consuming procedure, and must be done for each and every operation desired. Downtime is experienced while waiting for the computer programmer to intervene before the new cutting operation can be commenced.

The need to prepare individual computer programs for each operation does not lend itself well to instantaneous running by an operator. In direct contrast, the present invention discloses a computer-machine combination which writes its own programs for desired operations, and then is capable of using that new program to control the grinding machine. This saves time, money and aggravation.

Another problem which is addressed by the present invention entails a new apparatus and a new method of programming a dressing operation. One can note that after several operations of grinding, the surfaces of the grinding wheel have rough areas or uneven areas which will result in poor quality grinding. To maintain the grinding wheel surface, the grinding wheel needs to be evened out or "dressed".

In the past, in order to dress the grinding wheel, the grinding wheel was manually positioned above a rotating dressing wheel to grind the surface of the grinding wheel. Then, the grinding wheel was repositioned above the workpiece support apparatus. When the grinding wheel was repositioned after the dressing operation, it was extremely difficult to return the grinding wheel to the exact same position relative to the workpiece support apparatus, so some accuracy is lost when this act is performed. Maintaining millionths of an inch accuracy in this scenario became nearly impossible for even the most experienced dressing operator.

In view of the above-described problems with current methods of the prior art grinding and dressing techniques, the present invention seeks to provide an easy-to-use computer system for nearly instantly constructing its own individual computer programs capable of operating various grinding apparatuses.

Another provision being sought by the present invention is an easy-to-use computer system for constructing a computer program capable of operating various grinding apparatuses, which computer system allows for easy alterations to the constructed computer program.

Yet another provision being sought is a computer system for easily, accurately, and quickly operating the dressing of a grinding wheel without removing the grinding wheel from the grinding apparatus.

SUMMARY OF THE INVENTION

In accordance with the present invention, a serious improvement is disclosed for the grinding art to aid grinding operators in achieving extremely tight tolerances consistently, with the ability to shift between various grinding shapes and sizes almost instantaneously. Disclosed is a computer controlled grinding and dressing machine which can write (nearly instantaneously by the operator) its own computer programs with the input of specific data to allow for nearly seamless changes in operation, in addition to being capable of dressing the grinding wheel and regulating roller on site to keep the grinding operation within tolerances on the order of millionths of an inch.

Dressing of diamond and borazon wheels are made possible with the present machine in that all types wheel can be dressed. One of ordinary skill in the art can appreciate that grit wheels can be form dress as well on this machine. Any form can be made with the computer program.

Furthermore, there is disclosed a new embodiment of the dressing wheel, utilizing a "sawblade" sandwiched between two dressing stone portions. This new "sandwich" of a twin dressing stone/sawblade combination is especially useful for dressing and surface treating diamond or borazon wheels, as they can tend to "glaze" over with traditional dressing stones by themselves.

Yet one more aspect of the present invention is the full implementation of Windows-based software, including a Window for value increment increase or decrease while setting parameters. This alleviates the need for dial turning or other manual input of data as in the prior art.

Other advantages of the present invention will be readily appreciated as the same becomes better understood after reading the subsequent description taken in conjunction with the appendant drawings.

BRIEF DESCRIPTION OF THE DRAWINGS

FIG. 1C is a side elevation view of the grinding machine in operation.

DETAILED DESCRIPTION OF THE INVENTION

In accordance with the present invention, there is disclosed a computer controlled grinding machine capable of reproducibly grinding workpieces with extremely high tolerances on the order of millionths of an inch. The computer controlled grinding machine is also capable of changing from one grinding operation to another desired grinding operation without the interference of a computer programmer as this computer program can write its own grinding computer programs with the input of certain key data.

This entire operation can be done within the compact grinding machine as disclosed and claimed herein. As disclosed in the earlier U.S. Pat. No. 5,121,571 by one of the same inventors, a compact grinding machine can be used for centerless grinding. The additions of this invention include the computer control, the dressing wheel, and the incremental value box. Not only is the present invention more advantageous over the prior art because of its computer control system, there is also included a novel dressing wheel for keeping the tolerances in check, as well as an integrated value increment change box to further aid in accuracy. Furthermore, the present invention is a nice, neat compact unit that can fit into almost any shop for working.

Figure 1A:
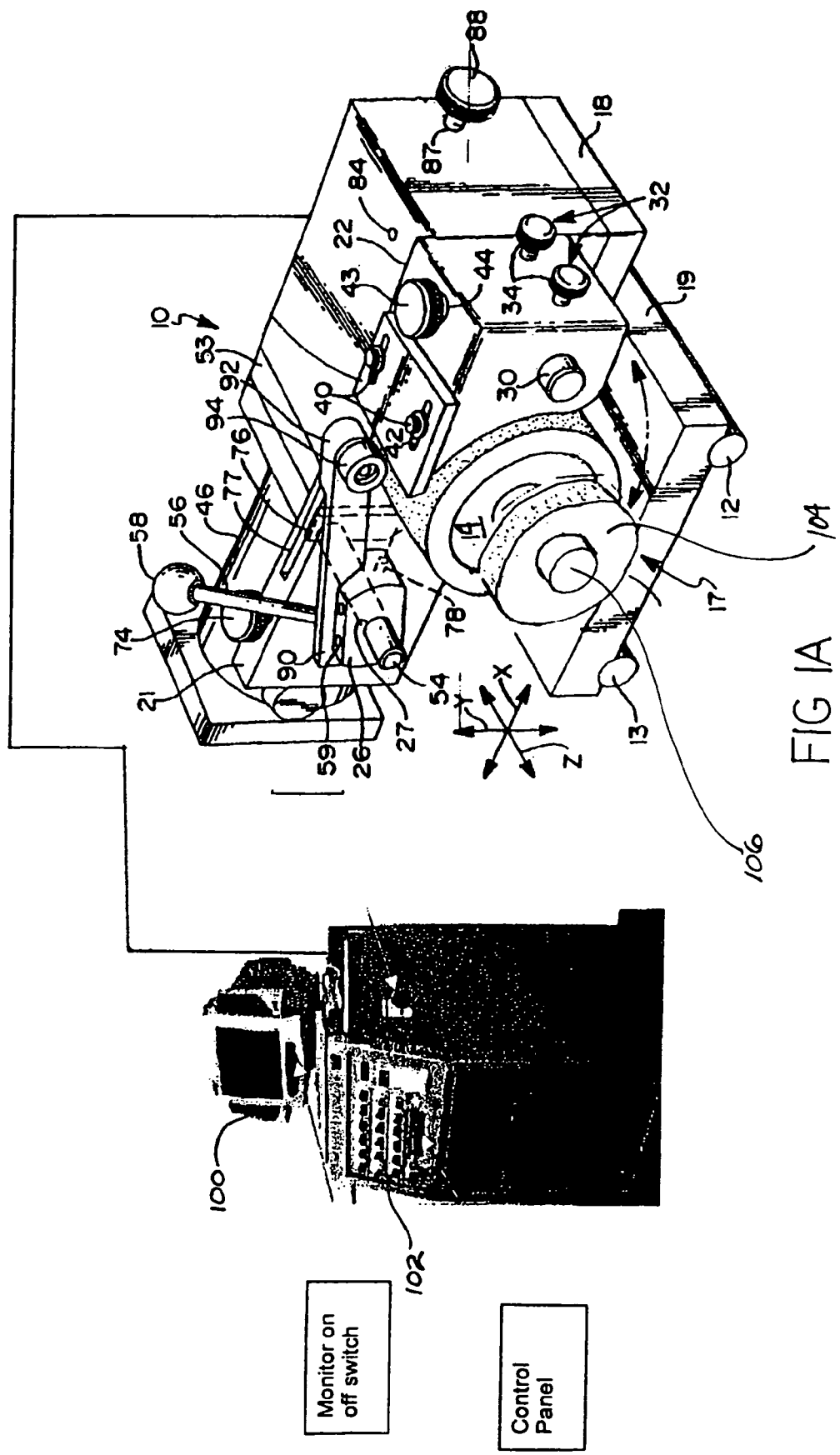
FIG. 1A is a representation of a computer controlled grinding machine according to the present invention.

FIG. 1A illustrates the connection between a computer 100 located within an electrical console 102 and a grinding machine 10. As must be noted, the grinding machine of the present example and figures can be interchanged with any other rotational operation, such as cut-off operations, lathe work, OD grinding, ID grinding, turning, besides centerless grinding. As one will be able to appreciate upon further review, the computer program disclosed herein may be used to advantage with any of these rotational operations without undue experimentation on the part of one of ordinary skill in the art. However, for ease of explanation, this discussion will be confined to centerless grinding.

Grinding machine 10 is located on rollers 12 and 13. The other parts are described and called out in incorporated U.S. Pat. No. 5,121,571. A dressing wheel 104 is now included, placed on the extending portion of the spindle. The grinding wheel (shown in FIG. 1C) is a separate wheel that is co-planar with the dressing wheel and the regulating roller. It can be lowered down onto the workpiece as the regulating roller 24 rotates the part to be ground by the grinding wheel.

Grinding machine 10 can hold the workpiece to be ground entirely on the regulating roller to effect centerless grinding, or the end of the workpiece can extend over the end for plunge grinding, form grinding (if the grinding wheel has been formed), and infeed grinding.

Due to the design of the grinding machine, no indicating is necessary. Parts being ground can be removed from the regulating roller, inspected, and then returned to the regulating roller by hand without any indicating, while still having part repeats within millionths.

In order to effect the dressing operation of the grinding wheel, the grinding wheel is jogged forward of the regulating roller to contact the dressing wheel attachment, and the computer can regulate how the grinding wheel is dressed. Dressing of the regulating roller is made easy by pivoting back the work blade 38.

Figure 1B:
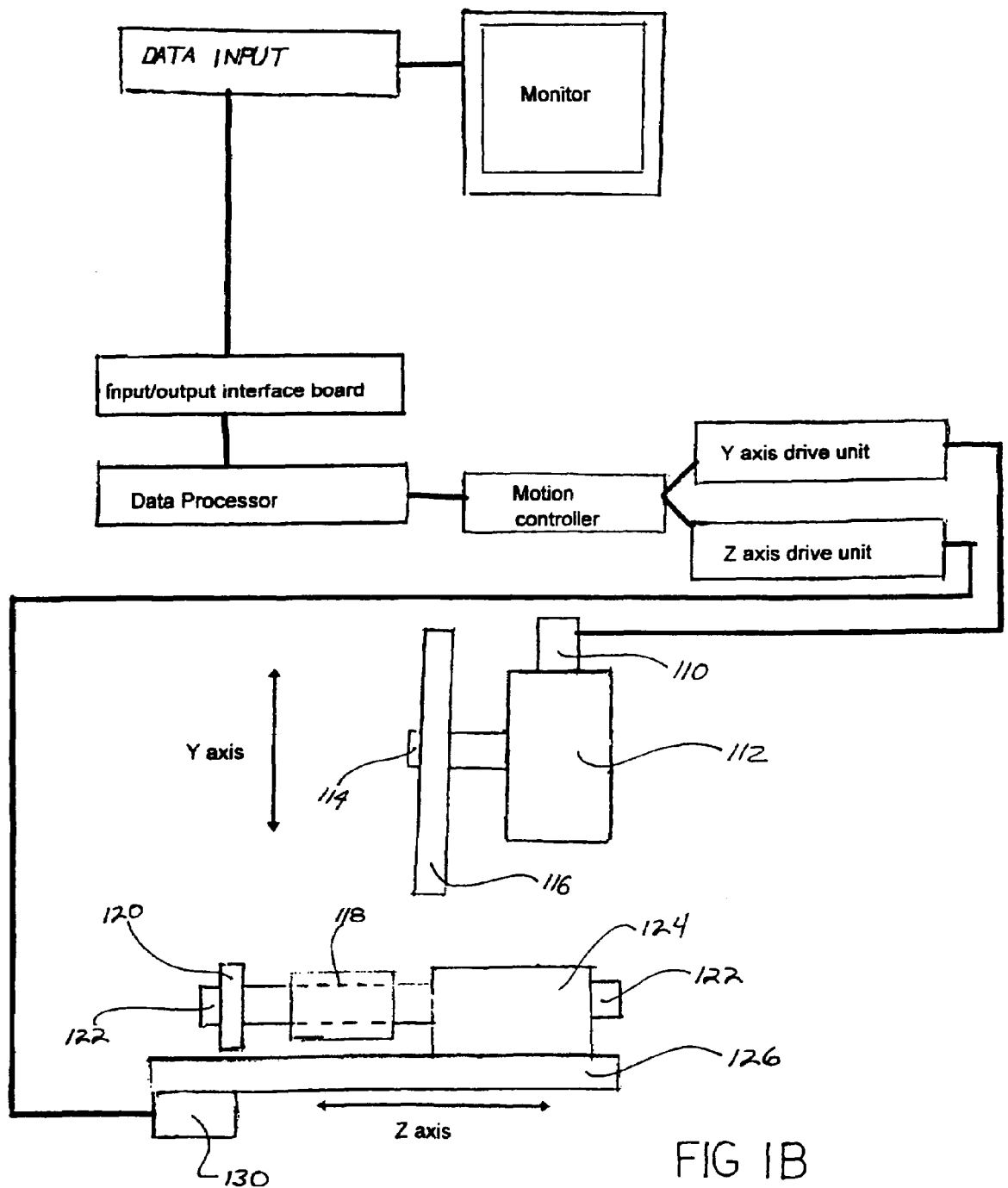
FIG. 1B is a schematic of the computer input as it relates to the grinding machine and its components.

FIG. 1B is a schematic diagram showing the interrelationship between the data input/monitor/IO interface board/data processor and the motion controller. Also, for purposes of discussion here, we will only be discussing the use of a keyboard, although it is thoroughly contemplated that a mouse may be used with equal efficacy. Consequently, all mention of data input or keyboards will be immediately interpretable to cover all forms of data input, whether it be keyboard, mouse, voice command, or the like.

FIG. 1C is a side view of the grinding machine of the present invention with workpiece 80 shown in place between the grinding wheel 14, the regulating roller 24, and the work blade 38.

Figure 2:
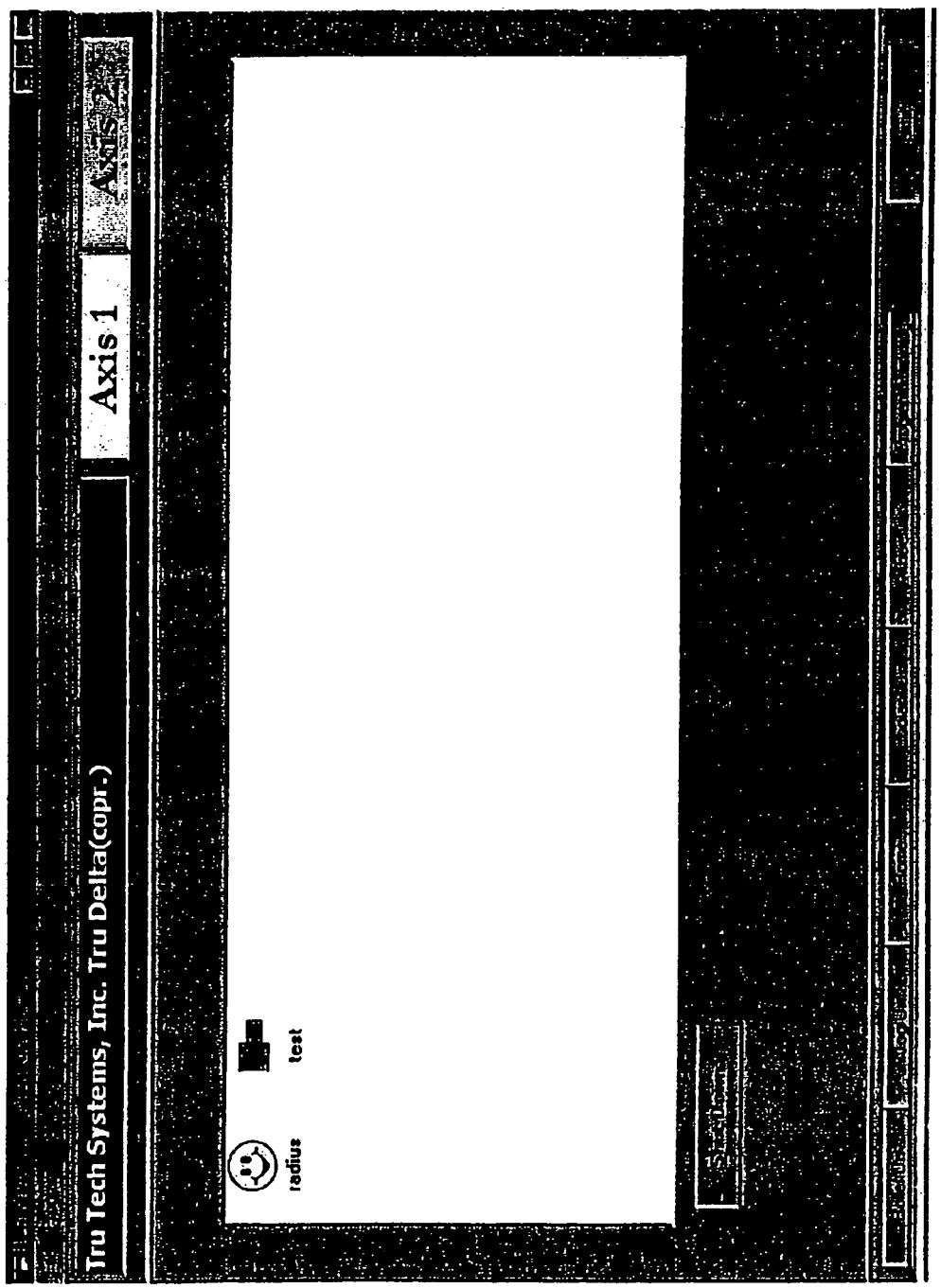
FIG. 2 is a start-up screen for the program menu operation.

FIG. 2 is a schematic representation of the interrelationships between the data processor and the grinding machine in skeleton. Y axis motor 110 is in communication with spindle head 112, which is in turn, attached to the spindle 114. Grinding wheel 116 is attached to the spindle 114, and may be lowered down onto a workpiece (not shown). Regulating roller 118 and carriage 124 are attached to spindle 122, as is the dressing wheel 120. Base 126 can be moved along the z-axis by z-axis motor 130 in order to effect the desired grinding.

With combined reference now to FIGS. 3-17, an example will be detailed of the computer programming control of the grinding machine, while all the steps are taking place. Note that all, if not nearly all, of the data input can be done with a mouse. This is a huge advantage over the prior art systems which required the use of the keyboard. As many machinists are uncomfortable with the use of keyboards, the nearly exclusive use of a mouse is key to marketability.

Figure 3:
FIG. 3 is a program name screen.

FIG. 3 indicates a smiley face and a test program. At the bottom of the screen in a "shut down" command to shut down the machine and the program. The smiley face is the last program ran.

In order to write a new program, the Program Menu screen will display on the monitor as shown in FIG. 3. Clicking on the word Program on the top tool bar displays the pull-down menu, and clicking on New allows you to select the icon that most closely resembles the profile of the part you would like to create. By making such a selection, and entering data as can be seen hereinbelow, the computer will assign certain characters to certain input, and numerical algorithms and/or computer programs will automatically be programmed into the computer.

Figure 4:
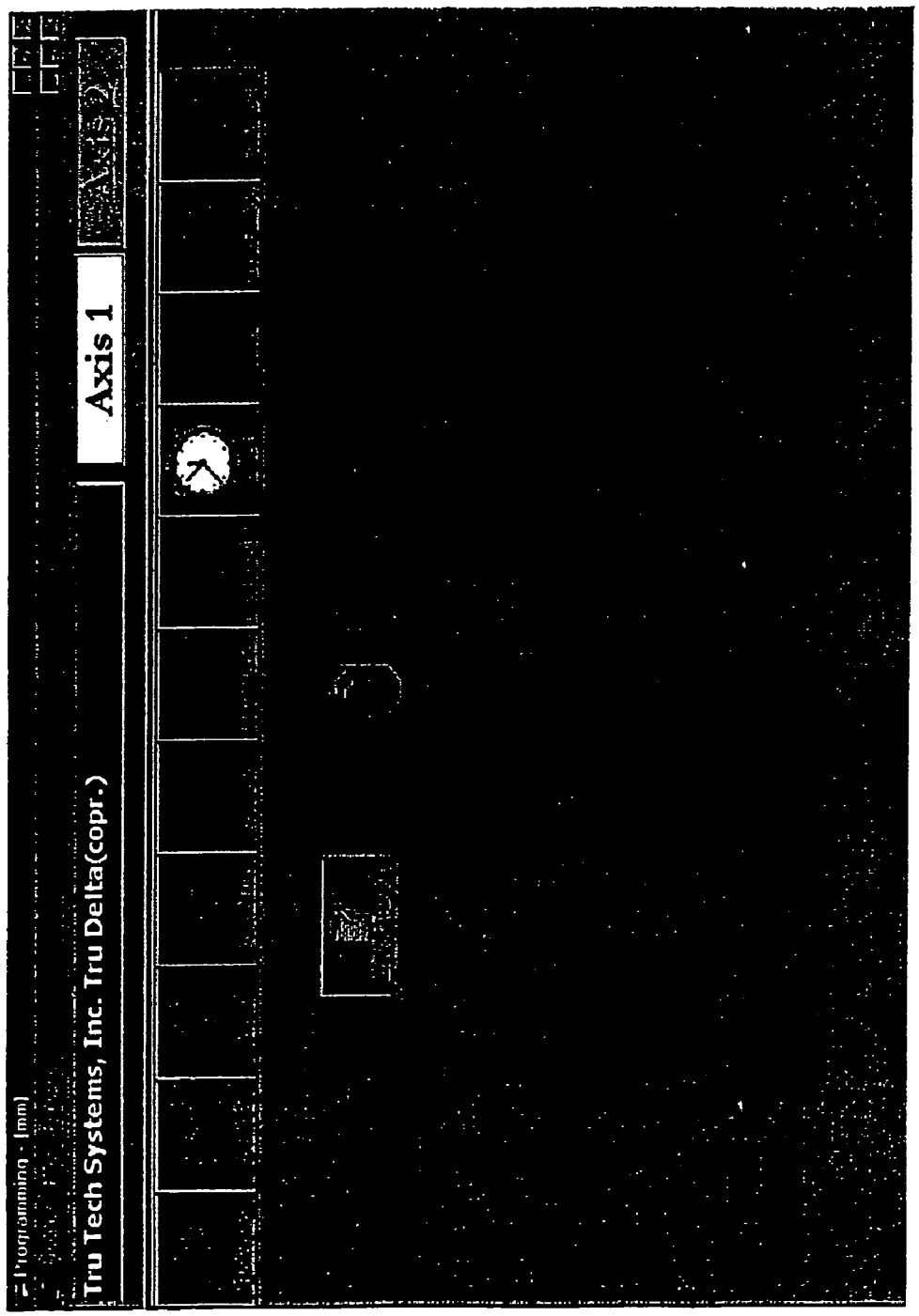
FIG. 4 is a create program screen.
Figure 5:
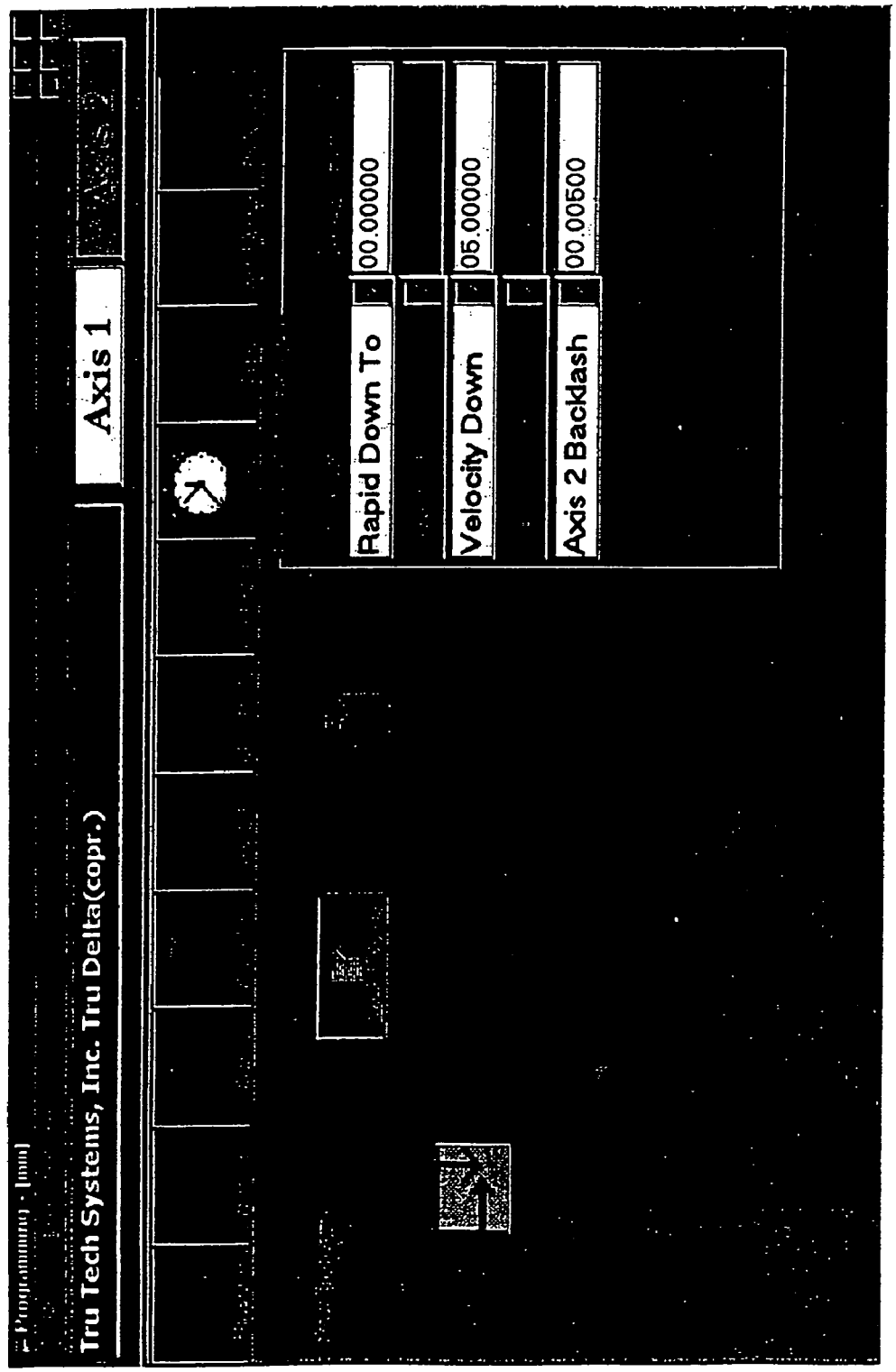
FIG. 5 is a move icon screen.
Figure 6:
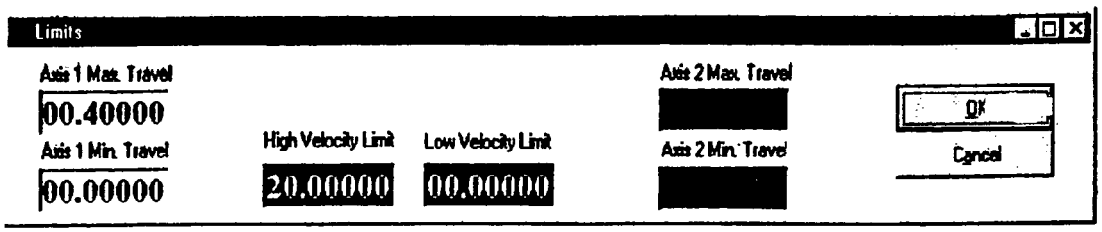
FIG. 6 is an edit icon values screen for Axis 1.

FIG. 4 shows the window with the "Write program" box, and clicking on that window will begin creation of the program. Note the MOVE ICONS at the top of the screen. The operator then selects the "MOVE ICONS" needed for running the desired grinding operation. FIG. 5 shows that once a MOVE ICON has been chosen, it is possible to change the order of the process. The properties of the MOVE display on the right side of the programming screen. FIG. 6 shows the screen used to edit the values of an icon. The values may be varied by either scrolling to the number desired, or by typing in the value on a keyboard. It is advisable to "home" the machine before proceeding further. This will re-zero the machine and gives the operator time to place the workpiece in the unit with the grinding wheel off by jogging the grinding wheel down to the top of the workpiece. While manually spinning the wheel, contacting the top of the part ensures a close fit. Thereafter, the wheel should be raised up about two thousandths of an inch. This sets Axis 1 in the program.

Figure 7:
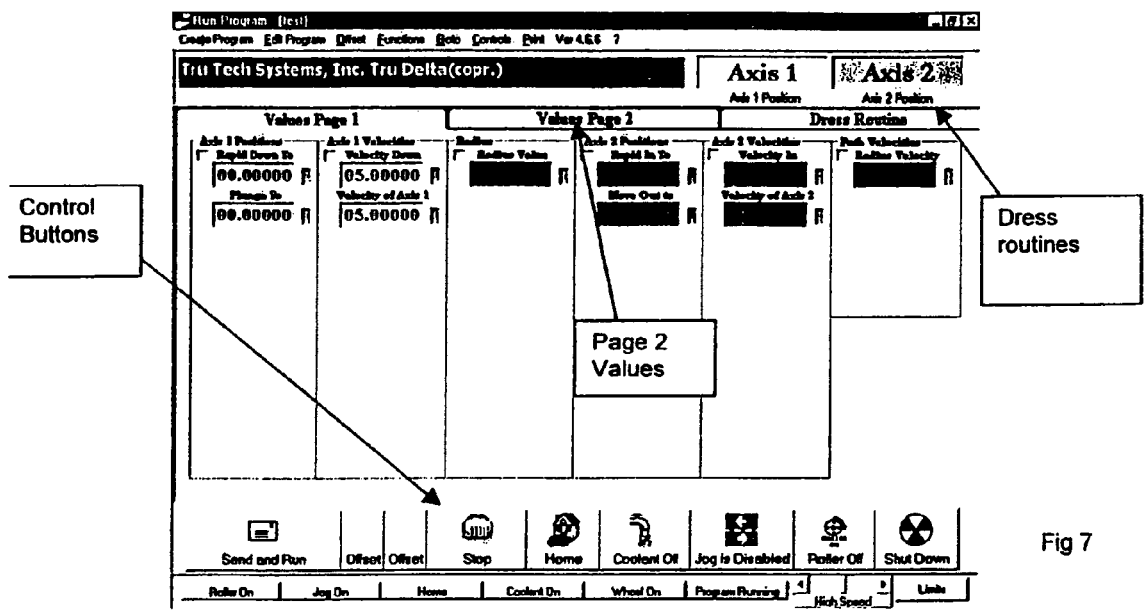
FIG. 7 is an edit icon values screen for Axis 2.

FIG. 7 shows a screen for setting the Axis 2 values. This is done by jogging the base of the machine out until the workpiece has cleared the wheel. By setting the grinding wheel down just in front of the workpiece, Axis 2 can be set. By pressing the window for Send and Run, the machine is set for grinding. By turning on the grinding switch, the coolant switch and cycle button on the control panel, the grinding operation begins if the result is totally desirable, unloading the newly ground part and replacing it with a new workpiece gets it ready to start another cycle.

Figure 8:
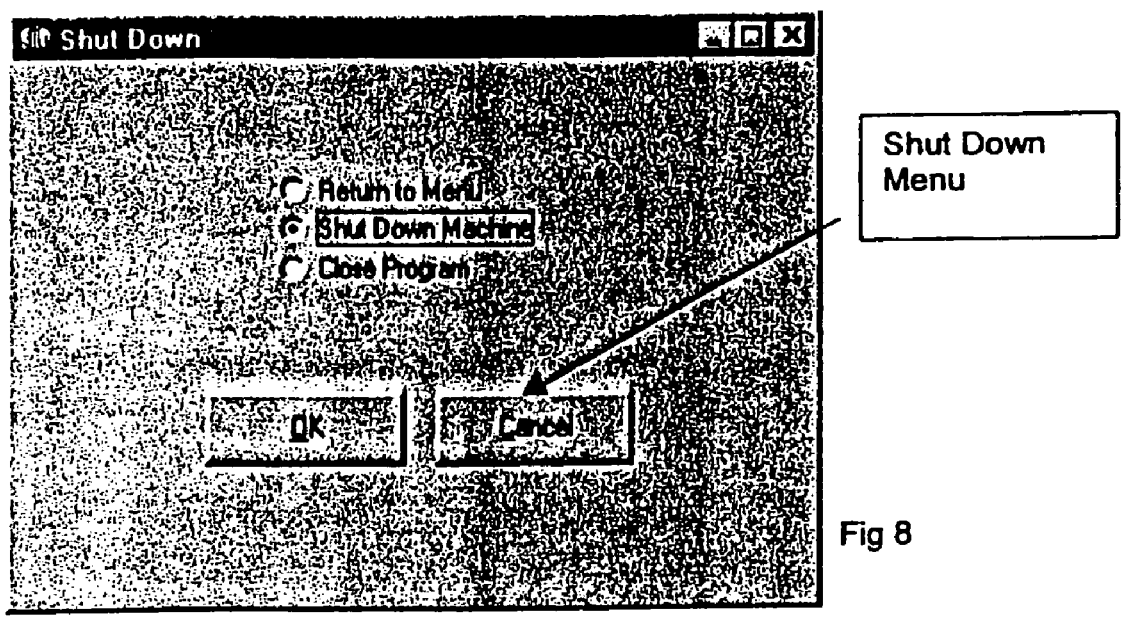
FIG. 8 is a shut down screen for the operation.

FIG. 8 is the screen for shutting down the operation. By clicking on the STOP button on the previous screen, a new SHUT DOWN pop-up menu appears. By selecting "Shut Down Machine", the machine can be turned off. This constitutes proper shutdown, and should not pose any danger to the computer, the information on the hard drive, nor should any computer lock-up be experienced.

Figure 9:
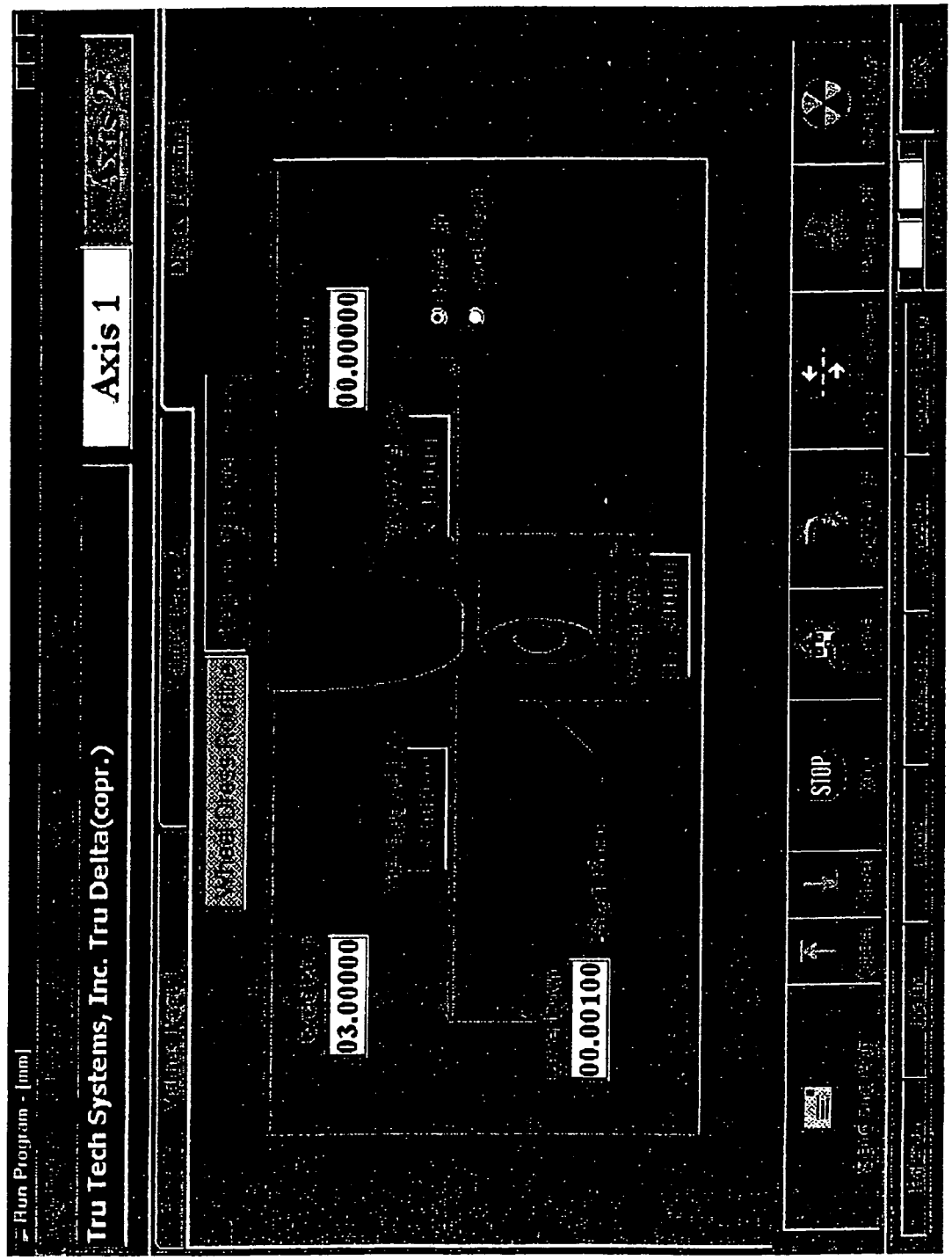
FIG. 9 is a dress wheel routine screen.
Figure 10:
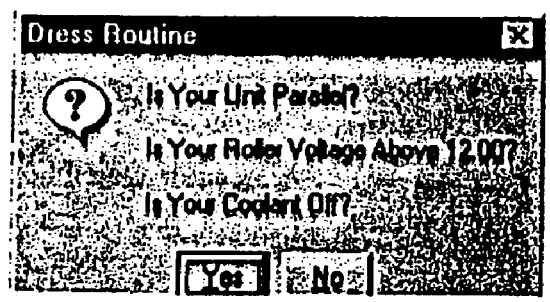
FIG. 10 is a reminder screen for the dressing.

FIG. 9 illustrates the dressing operation and the computer screen that goes along with it. The Run Program screen has a button to locate the Dress Routine Tab. Clicking on it causes a window to pop up. Select either the Wheel Dress Routine or the Regulating Roller Dress. Making sure to check the direction of the reverse sweep allows the operator to set it up to either plunge down and sweep back or to rise up and sweep back. By selecting Send and Run, the Dress Routine dialog box (FIG. 10) pops up, which reminds the operator to do certain safety precautions.

The dressing operation can begin on-site as the grinding wheel is jogged back onto the dressing wheel. The operator merely lowers the wheel until it slightly touches the dressing wheel, and then he moves the wheel toward the unit until it is clear from the dressing wheel. This sets the parameters for the cycle, and the wheel will now sweep across the dressing roller at predetermined amounts. The initial sweep has an amount of 01.50000" at a forward velocity of 05.00000", raising up 00.00200", and moving back 01.50000" at a reverse velocity of 10.00000". Then it lowers down 00.00300" and sweeps across the dressing roller.

Figure 11:
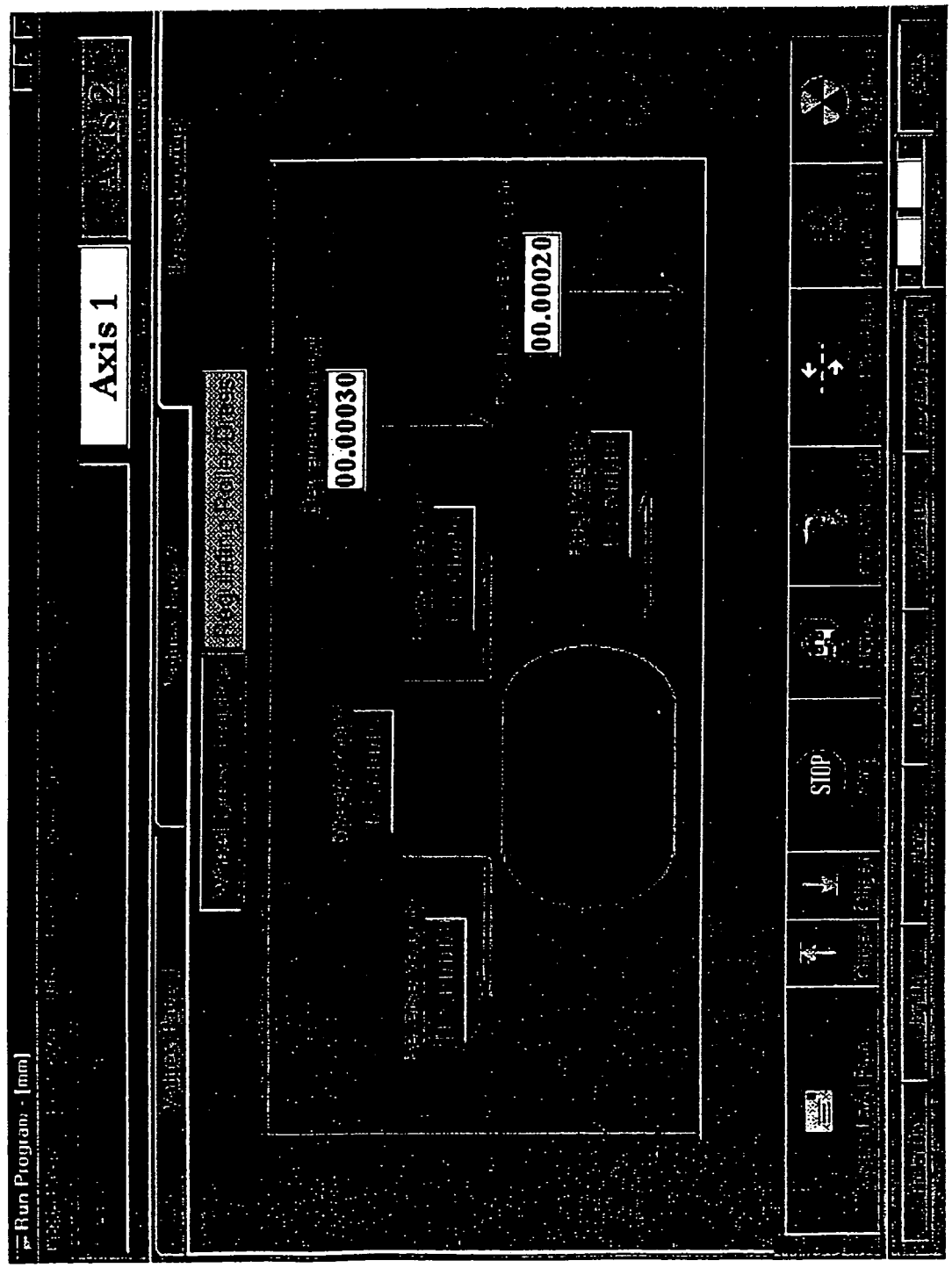
FIG. 11 is a regulating roller dress routine screen.

FIG. 11 shows the routine for dressing the regulating roller. Again, going to the Run Program Screen will locate the Regulating Roller Dress Routine Tab. As before, clicking on it will cause a window to pop up, and similar activities as before will take place.

Figure 12:
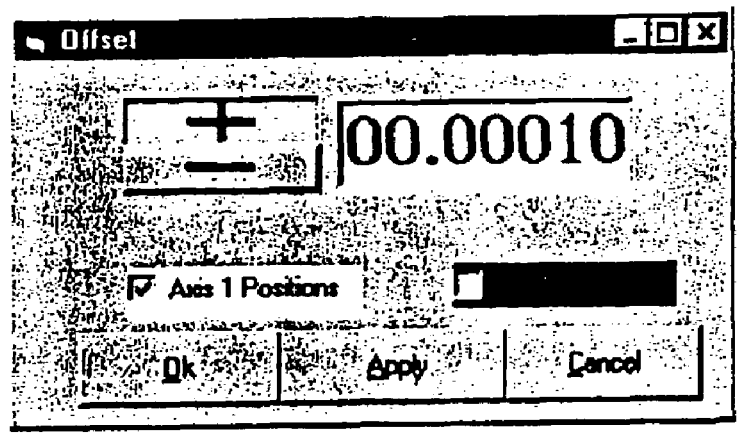
FIG. 12 is a run program menu screen for increasing or decreasing the tolerances of position.

FIG. 12 is the screen which is used for increasing or decreasing the tolerances of position. By putting the number in the value box and clicking on the + or the − sign, the tolerance will either increase or decrease. After selecting the positions that this will apply to, the changes take place via a computer program that the computer writes itself. The computer writes these programs by correlating certain characters that it assigns to various values or configurations to further preselected general shapes. However, by utilizing the characters correlated to various values input, individual computer programs are written.

Figure 13:
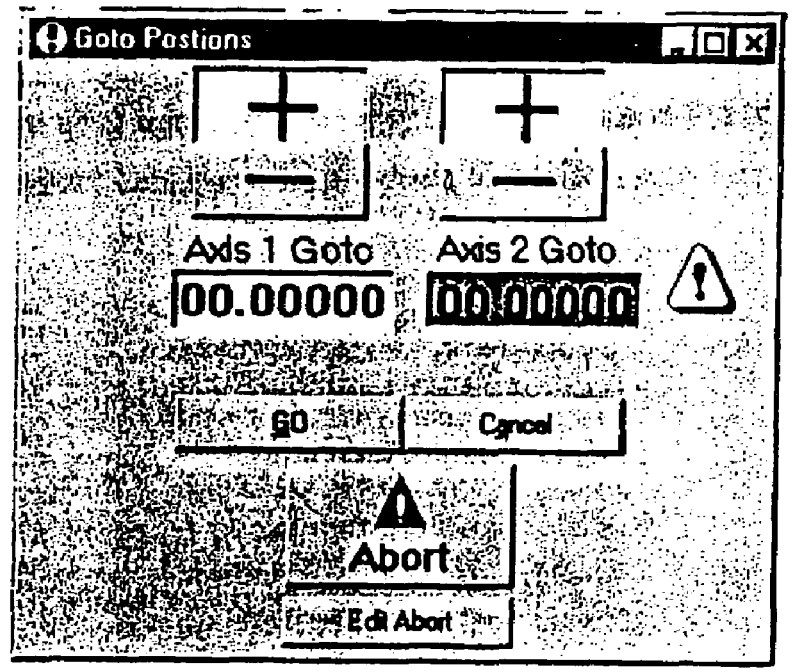
FIG. 13 is a goto screen for the home machine.
Figure 14:
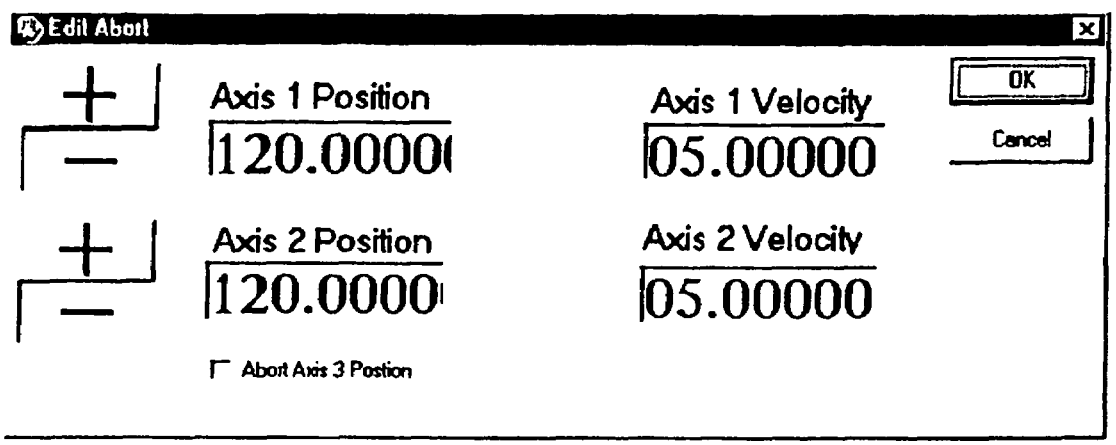
FIG. 14 is an edit abort screen for setting the velocity of the abort.

FIG. 13 is the GoTo screen which is used after a grinding job has already been set up and the machine is at the original home position. By using the set-up values to position Axis 1 and Axis 2, the job can be recreated. The Abort button can be used at any time during any program. To use the abort during a program, hitting the space bar on the keyboard will abort the cycle. FIG. 14 is the screen to be used to edit the abort permitting the operator to set the velocity and the position that is desired for use during the abort.

Figure 15:
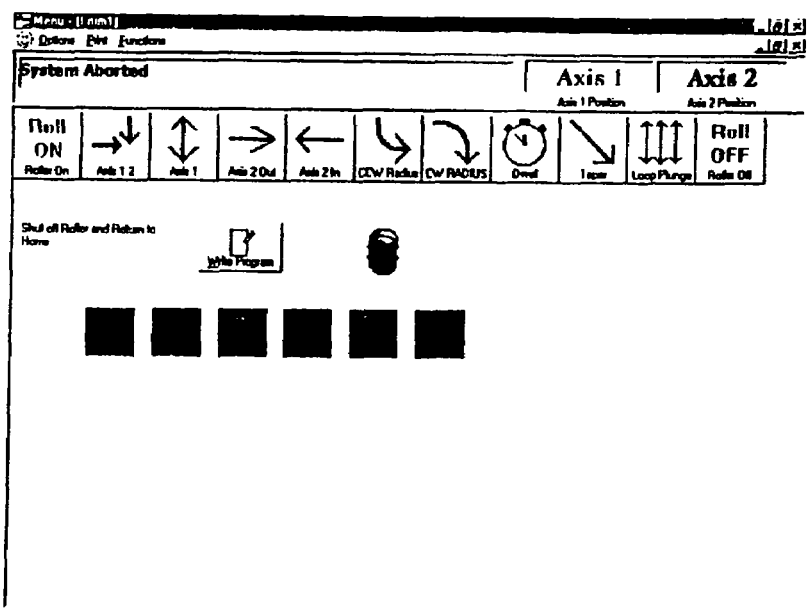
FIG. 15 is a programming menu screen to show how to change between operations.
Figures 16, 17:
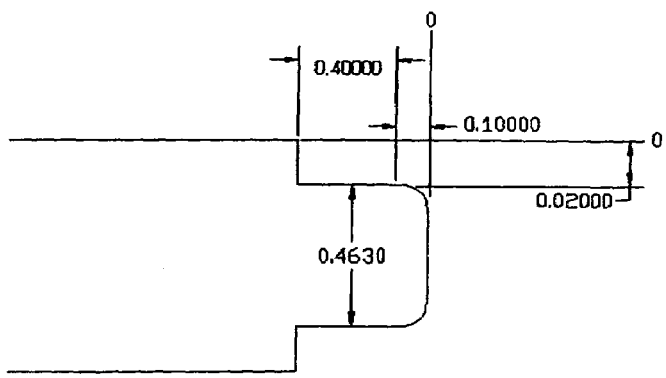
FIG. 16 is a value set screen.
FIG. 17 is a radius and shape of an example part.

FIGS. 15-17 indicate the screens for an illustrative example of a precision grinding to be performed on a half inch diameter by three inch long piece of graphite. After the Program menu appears, create and name a new program. For this example, we will name the program "RADIUS". Clicking on the 17th icon will help to visualize the part. Clicking on the Create Program button, and the Programming window will pop up. By entering the MOVE ICONS as shown in FIG. 15, the radius will be at 50% to 100% (which is the default setting). Enter the values as shown in FIG. 16, and click on the "Write" the program and test it. FIG. 17 shows the resultant part that has a dip, then a taper with a diameter of 0.4630 and the radius that ends at the tip.

Another aspect of the present invention includes a new dressing stone configuration which has increased efficacy, which is especially useful for diamond and borazon wheels.

Figure 18:
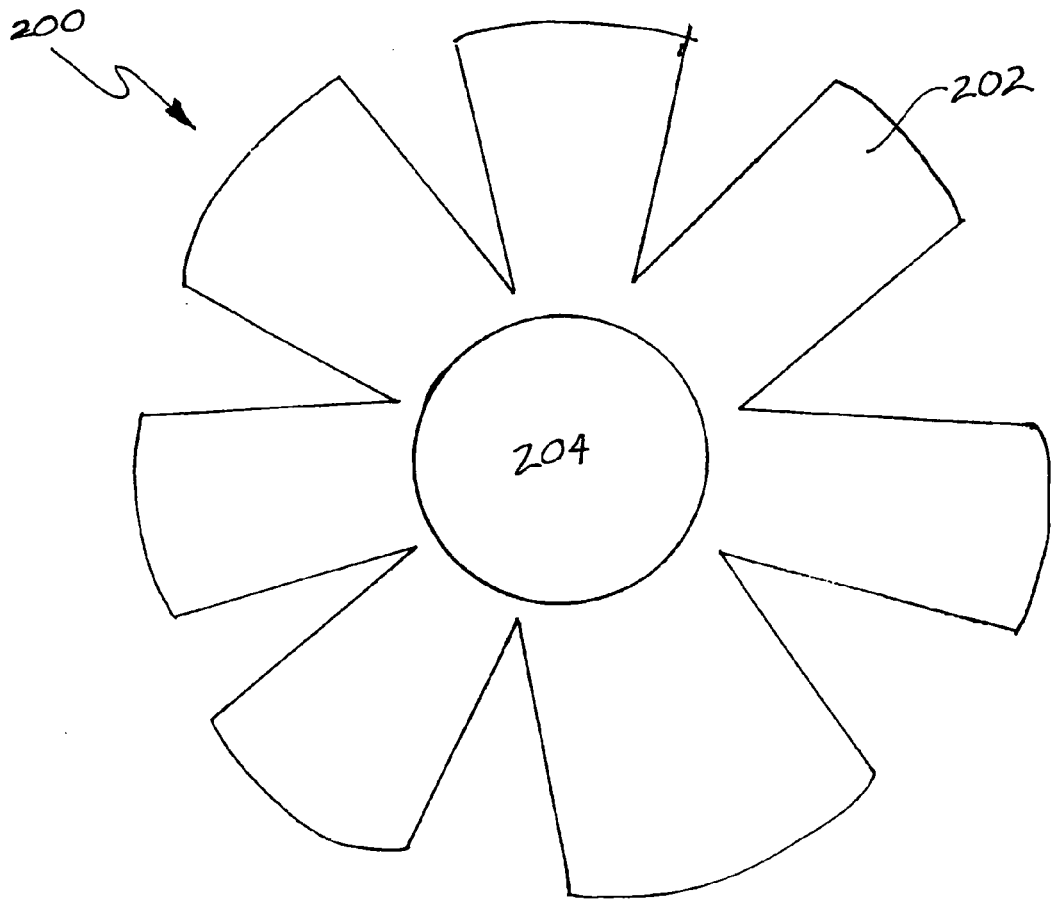
FIG. 18 is a side elevational view of a sawblade in accordance with the present invention.
Figure 19:
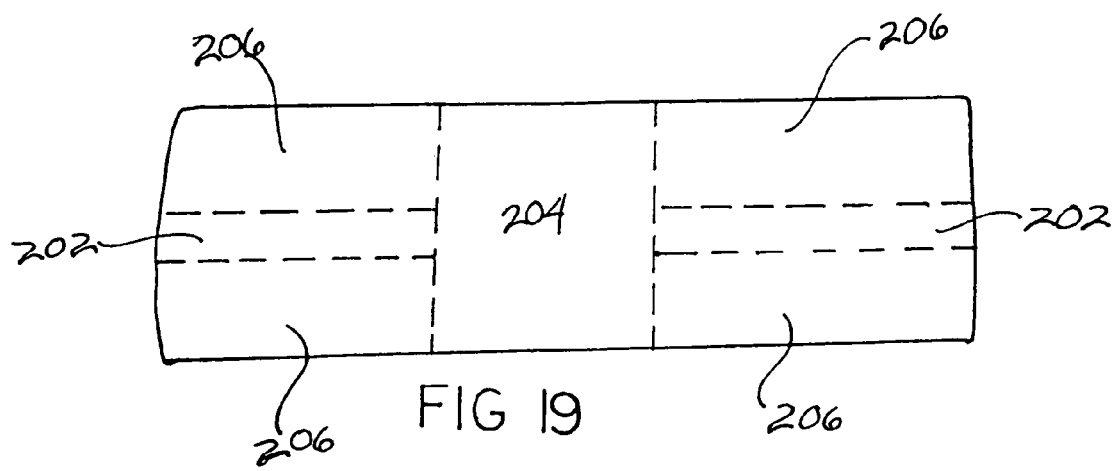
FIG. 19 is a side elevational view of a dressing stone/sawblade sandwich configuration in accordance with the present invention.

FIG. 18 shows the new "sawblade" design of dressing wheel component 200 with sawblades 202 and a central orifice 204 for attachment to a spindle. FIG. 19 shows a side elevational view of the dressing wheel with a "sandwich" of dressing stones 206 over and under the sawblade 202, again surrounding an orifice 204 for attachment. The teeth of the sawblade act to rip off and roughen the surface of a wheel being dressed without glazing or heat expanding the wheel being dressed.

Therefore, there is a new computer controlled grinding machine in accordance with the present invention that will write its own computer programs, provide on-site dressing, and perform its tasks by utilizing a mouse. Furthermore, the value increments can be scrolled up and down without having to type in values. The appendant claims will further define the invention.

INDUSTRIAL APPLICABILITY OF THE INVENTION

The industrial applicability of the present invention includes use for grinding workpieces to be used in various industries, and also includes use for the preparation of extremely close tolerance machined workpieces.

We claim:

1. A workpiece support apparatus for centerless grinding, comprising:
   a carriage having an edge;
   a rotatable spindle extending through the carriage that has an extending portion extending beyond the edge of the carriage;
   a regulating roller mounted on the extending portion of the spindle for supporting and rotating the workpiece;
   a wheel dressing roller having a polishing outer surface and being mounted on the extending portion of the spindle distal of the carriage relative to the regulating roller; and
   means for rotating the spindle which hereby rotates the regulating roller and the wheel dressing roller.

2. The support apparatus according to claim 1, wherein the wheel dressing roller has an outer diameter which is less than the outer diameter of the regulating roller.

3. A centerless grinding machine, comprising:
   a workpiece support apparatus including a carriage with an edge;
   a rotatable spindle extending through the carriage that has an extending portion extending beyond the edge of the carriage;
   a regulating roller mounted on the extending portion of the spindle for supporting and rotating the workpiece;
   a wheel dressing roller having a polishing outer surface and being mounted on the extending portion of the spindle distal of the carriage relative to the regulating roller; and
   means for rotating the spindle which hereby rotates the regulating roller and the wheel dressing roller;
   a computer system having a user interface, including a means for data input and a monitor;
   an input/output (I/O) interface board electronically connected to the user interface;
   a data processor electronically connected to the I/O board;
   a motion controller electronically connected to the I/O board;
   a y-axis drive unit electronically connected to the motion controller;
   a z-axis drive unit electronically connected to the motion controller;
   a y-axis motor electronically connected to the y-axis drive unit;
   a z-axis motor electronically connected to the z-axis drive unit; and
   a grinding wheel;
   wherein the grinding wheel and the wheel dressing roller being connected to the y-axis motor and the z-axis motor such that the y- and z-axis motors can cause the grinding wheel and the wheel dressing roller to contact each other so that when the grinding wheel and the wheel dressing roller are rotating, the wheel dressing roller will smooth the surface of the grinding wheel, and
   the data processor is operable for controlling the y-axis motor to control the depth of grinding and for controlling the x-axis to control the grinding wheel and the wheel dressing roller to sweep past one another longitudinally.

4. The machine as claimed in claim 3, wherein the grinding wheel and the regulating roller are connected to the y-axis motor and the z-axis motor such that the y- and z-axis motors can cause the grinding wheel and the regulating roller to contact each other so that when the grinding wheel and the regulating roller are rotating, the grinding wheel will smooth the surface of the regulating roller; and
   the data processor is operable for controlling the x-axis to control the grinding wheel and the regulating roller to sweep past one another longitudinally.

5. The machine as claimed in claim 3, wherein the computer system operates a program for enabling a user through the user interface to control the processor of dressing the grinding wheel using the wheel dressing roller, the program comprising;
   means for displaying a template which includes at least one value receptacle, the value receptacle relating to a variable in the process of dressing a grinding wheel;
   means for accepting a value from the user and displaying the value in the value receptacle.

6. The machine as claimed in claim 5, wherein the program comprises means for changing the value in the value receptacle to either increase or decrease the tolerances by using a mouse to scroll up or down a value list.

7. The machine as claimed in claim 5, wherein the program further comprises means for enabling modification of the accepted value.

8. The machine as claimed in claim 5, wherein the program enables a user through the user interface to control the processor of dressing the regulating roller using the grinding wheel, the program further comprising;
   means for displaying a template which includes at least one value receptacle, the value receptacle relating to a variable in the process of dressing a regulating wheel;
   means for accepting a value from the user and displaying the value in the value receptacle.

9. The machine as claimed in claim 8, wherein the program further comprises means for enabling modification of the accepted value.

* * * * *